(12) United States Patent
Lisiecki (10) Patent No.: US 8,708,830 B2
(45) Date of Patent: Apr. 29, 2014

(54) BREAK AWAY SPLINE MISALIGNMENT COUPLING

(75) Inventor: Joseph M. Lisiecki, Springhill, FL (US)

(73) Assignee: Robert M. Jones, Brooksville, FL (US)

( * ) Notice: Subject to any disclaimer, the term of this patent is extended or adjusted under 35 U.S.C. 154(b) by 145 days.

(21) Appl. No.: 12/435,082

(22) Filed: May 4, 2009

(65) Prior Publication Data

US 2010/0279777 A1 Nov. 4, 2010

(51) Int. Cl.
*F16D 9/08* (2006.01)

(52) U.S. Cl.
USPC .......................................................... 464/32

(58) Field of Classification Search
USPC ............... 464/32, 33, 155, 156; 403/2, 359.6, 403/383; 285/4
See application file for complete search history.

(56) References Cited

U.S. PATENT DOCUMENTS

| | | | |
|---|---|---|---|
| 4,971,267 A * | 11/1990 | Fulton et al. | 464/32 X |
| 5,141,255 A * | 8/1992 | Hanaoka | 285/4 |
| 5,397,155 A * | 3/1995 | Inda et al. | 285/4 |
| 5,733,196 A | 3/1998 | Nienhaus | |
| 5,800,137 A * | 9/1998 | Eitai et al. | 464/32 X |
| 6,077,165 A | 6/2000 | Jewell | |
| 6,116,394 A | 9/2000 | Ruth | |
| 6,186,299 B1 | 2/2001 | Ruth | |
| 6,283,868 B1 | 9/2001 | Clarke et al. | |

FOREIGN PATENT DOCUMENTS

| | | |
|---|---|---|
| CN | 1309749 A | 8/2001 |
| JP | 2003-515709 | 5/2003 |
| KR | 2001-0071481 | 7/2001 |

OTHER PUBLICATIONS

DuPont Performance Elastomers [online] Feb. 5, 2007 [retrieved on Jul. 12, 2011]. Retrieved from the Internet: <URL: http;//web.archive.org/web/20070205054004/http://www.dupontelastomers.com/products/viton/>.*
AND20000 as filed by the inventor Jan. 14, 2012.*
International Search Report and Written Opinion of the International Searching Authority, for Application No. PCT/US2010/033534, 10 pages, dated Jan. 24, 2011.

* cited by examiner

*Primary Examiner* — Gregory Binda
(74) *Attorney, Agent, or Firm* — Jill C. Shedd, Esq.

(57) ABSTRACT

A torque-limiting coupling may be used to provide a torsion drive between an engine or motor and a driven accessory. If an accessory should experience a catastrophic failure a torsion limit is exceeded and a spline breaks away from the coupling. This guarantees that the internal engine gearing used to drive the accessory is not compromised and interfering with essential moving parts inside the engine. Further, a misalignment compensation limits the side load and wear that occurs when coupling two precision shafts with little clearance on the bearings. With a misalignment coupling, the mount can be slightly out of parallel with no negative effects.

14 Claims, 7 Drawing Sheets

BREAK AWAY SPLINE MISALIGNMENT COUPLING

BACKGROUND OF THE INVENTION

It is common for a torsion drive to be employed between an engine and a drive accessory. For example, in automobiles, a belt drive is often used to transfer power from the engine to various accessories, such as a compressor, alternator, generator and numerous pumps. Should any of these accessories experience a catastrophic failure, such as a seized bearing, the accessory will cease functioning and the belt drive will continue to function properly. Although the belt will slip past the non-functioning accessory, possibly causing damage to the belt itself, it is extremely unlikely that damage to other accessories or the engine will occur as a result of the failure of the accessory.

In small aircraft, however, a belt drive is not used to power accessories from an engine. Rather, accessories are driven directly from gears disposed in an accessory case typically located at the rear of the engine. In this design, should a catastrophic failure occur in an accessory, such as a seized bearing as described above or a broken rotor shaft, excessive torques may be experienced throughout the system, including other accessories or even the engine itself. Because all components, including the engine and its accessories, are linked mechanically via the system of gears and shafts, a failure of any one accessory that causes its rotating components to stop, may cause the entire system of the engine and its accessories to seize up. Such extreme torques also can cause damage to those components as well as the gears used to drive them. For example, the seizing of one component mechanically linked to another also may cause that other component to seize or may cause teeth to break off gears. Thus, although mechanical drives are less likely to fail because of a worn belt, they lack the failsafes that belts provide in preventing damage to components in the event of a catastrophic failure of a component of the system.

SUMMARY OF THE INVENTION

A torque-limiting coupling may provide a torsion drive between an engine and a driven accessory. If the accessory should experience a catastrophic failure, such as a locked bearing or broken rotor shaft, a torsion-limited spline breaks away from the coupling. This guarantees that the internal engine gearing used to drive the accessory is neither compromised nor interferes with other essential moving parts inside the engine. Further, misalignment compensation provided by a lobe end limits the side load and wear that occurs when coupling two precision shafts with little clearance on the bearings. With a misalignment coupling, the respective shafts can be mounted slightly out of parallel with no negative effects.

The neck region provides a highly predictable clean break with no failure or stripping of drive components. A portion of the neck region may have a smaller cross-sectional area than either the first end or the second end. The smaller cross-sectional area may be manufactured, for example, by creating a bore through the neck region or by reducing the outer diameter of the neck region.

The first end may include a spline fitting, which may conform to the "AND20000 Rev 4 cancelled on Apr. 29, 1980" mounting convention. The AND20000 mounting convention is a standard aircraft accessory case mounting configuration. Further, the second end may include at least one cam lobe or, alternatively, two opposing cams. A band of material having a softer durometer than the material of the second end, such as a flouroelastomer rubber ring (e.g., VITON®), may surround at least a portion of the second end.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figures 1, 1A:
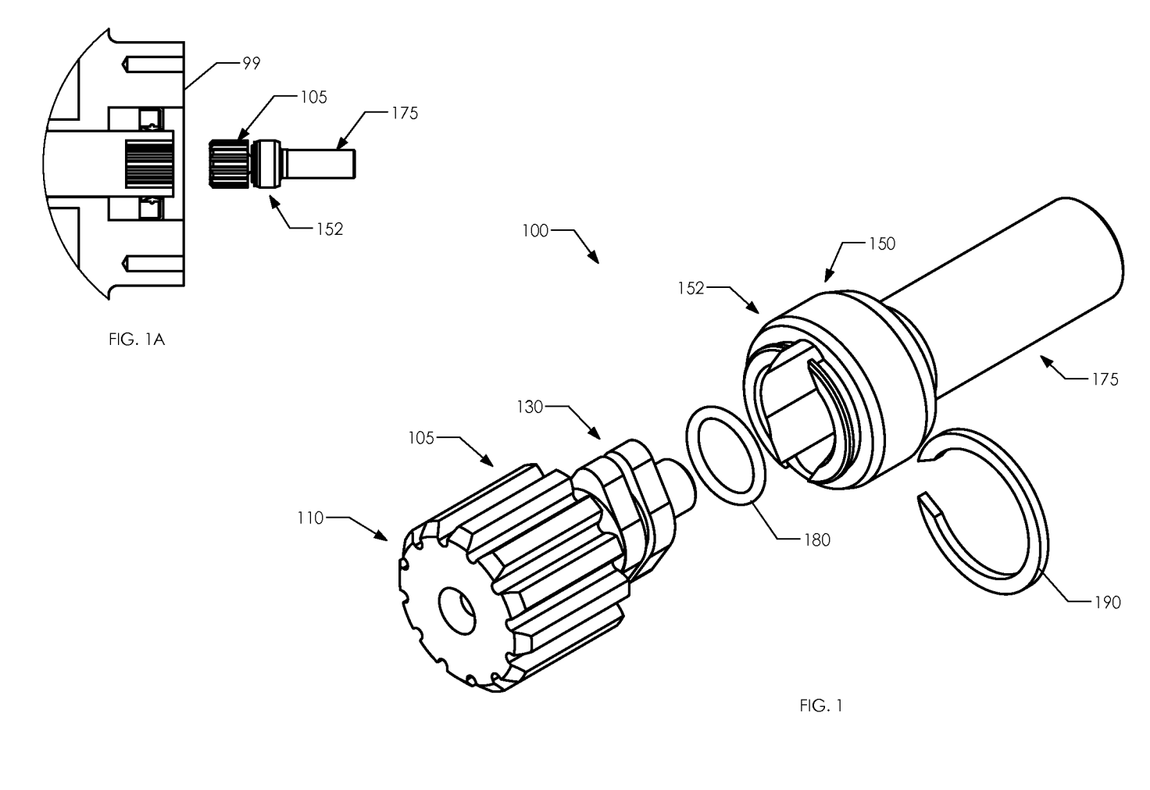
FIG. 1 is a perspective diagram of a torque-limiting coupling in a disassembled state according to an example embodiment of the present invention.
FIG. 1A is a perspective diagram of the example embodiment torque-limiting coupling of FIG. 1 in an assembled state and how it would be configured to mate to a transmission output of a torque generating device, such as an engine.

FIG. 1 is a perspective diagram of a torque-limiting coupling 100 in a disassembled state, comprising a break away spline coupler 105 and a break away spline receiver 150. The break away spline coupler 105 comprises a spline end 110 and a lobe end 130. The break away spline receiver 150 comprises a receiver end 152 and a shaft end 175. In its assembled state, discussed below with reference to FIGS. 4A-4D, the assembled coupler 100 further includes an o-ring 180 and a retaining ring 190.

FIGS. 2A-2F illustrate several views of the break away spline coupler 105 of FIG. 1.

Figure 2A:
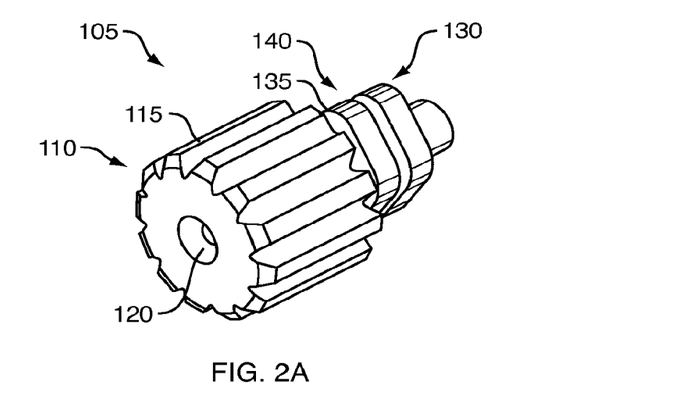
FIG. 2A is a perspective diagram of the example embodiment break away spline coupler of FIG. 1.

FIG. 2A is a perspective diagram of the break away spline coupler 105 of FIG. 1. The break away spline coupler 105 comprises a spline end 110 and a lobe end 130. The spline end 110 includes a plurality of longitudinally extending circumferentially spaced splines 115 and is configured to be mated coaxially to a transmission output of a torque generating device 99, such as an engine. The spline end 110 further includes a bore 120 for tuning the break away spline coupler 105 to break at a predefined torque, also discussed below with reference to FIGS. 4A-4D. The lobe end 130 of the break away spline coupler 105 includes a lobe 135, with an o-ring slot 140 included thereon, and is configured to couple the break away spline coupler 105 coaxially to the break away spline receiver (e.g., break away spline receiver 150 of FIG. 1).

Figure 2B:
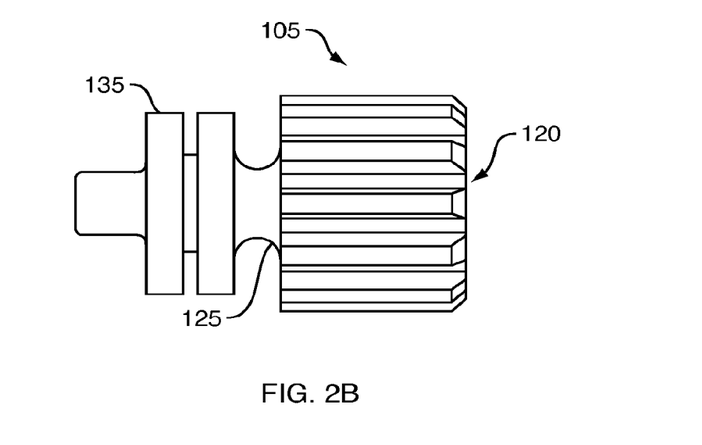
FIG. 2B is a lateral diagram of the example embodiment break away spline coupler of FIG. 2A.

FIG. 2B is a lateral (or side view) diagram of the break away spline coupler 105 of FIG. 2A. The bore 120 may be employed in conjunction with a neck region 125 of the break away spline coupler 105, the diameter of which also may be tuned to set the predefined breaking torque of the coupler 105. Further, the o-ring slot 140, located between the cam lobes 135, may accept an o-ring (e.g., o-ring 180 of FIG. 1) during assembly of the torque-limiting coupler 100.

Figure 2C:
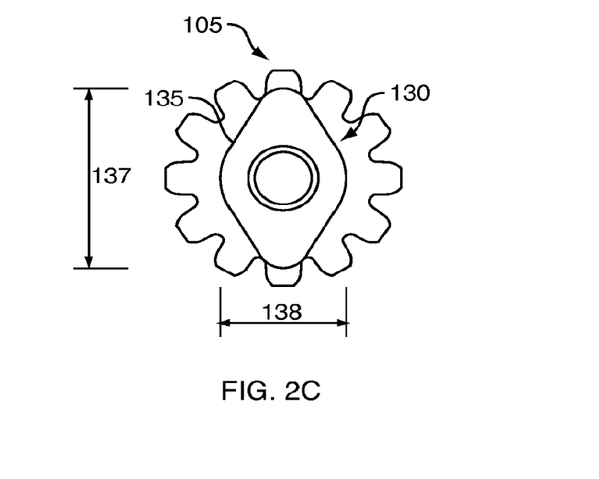
FIG. 2C is an axial diagram of the example embodiment break away spline coupler of FIG. 2A from a lobe end.
Figure 2D:
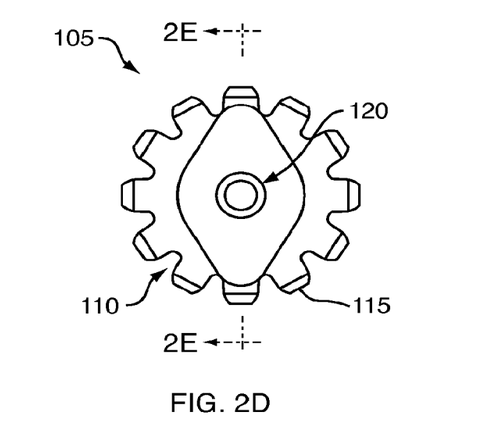
FIG. 2D is an axial diagram of the example embodiment break away spline coupler of FIG. 2A from a spline end.

FIG. 2C is an axial diagram of the break away spline coupler 105 of FIG. 2A from the lobe end 130. As illustrated, the lobe 135 is defined, in part, by a major lobe diameter 137 and a minor lobe diameter 138. FIG. 2D is an axial diagram of the example embodiment break away spline coupler 105 of FIG. 2A from the spline end 110. As illustrated, the spline end 110 of the break away spline coupler 105 includes the plurality of splines 115 and the axial bore 120 for tuning the break away spline coupler 105 to break at a predefined torque.

Figure 2E:
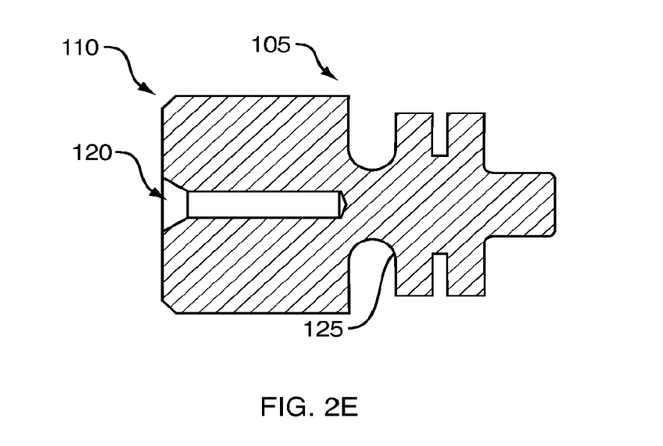
FIG. 2E is a cross-sectional diagram of the example embodiment break away spline coupler of FIG. 2D taken along line A.

FIG. 2E is a cross-sectional diagram of the break away spline coupler 105 of FIG. 2D taken along line A. As can be seen, the bore 120 may, for example, be drilled from the spline end 110 to a particular depth toward, into or even across the neck region 125 of the break away spline coupler 105. Further, the outer diameter of the neck region 125 may be adjusted. The depth of the bore 120 in combination with the outer diameter of the neck region may be used to change the cross-sectional area of the neck region 125, thereby allowing the breaking torque of the break away spline coupler 105 to be adjusted.

Figure 2F:
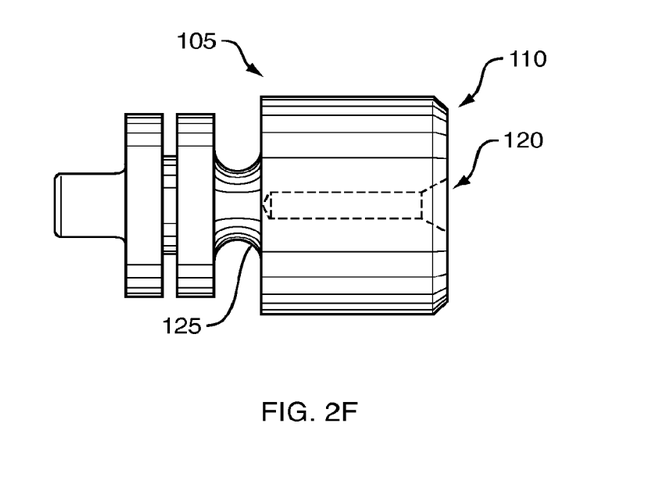
FIG. 2F is a lateral diagram of the example embodiment break away spline coupler of FIG. 2A in blank form prior to shaping of the splines.

FIG. 2F is a lateral diagram of the break away spline coupler 105 of FIG. 2B in blank form prior to shaping of the splines 115 (not shown). The splines may be shaped on the spline end 130 of the break away spline coupler 105, for example, by a machining process. Further, the depth of the bore 120 and the outer diameter of the neck region 125 may adjusted as well.

FIGS. 3A-3E illustrate several views of the break away spline receiver 150 of FIG. 1.

Figure 3A:
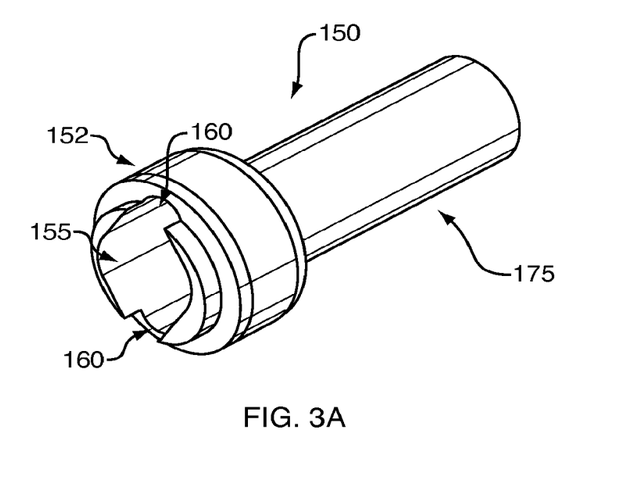
FIG. 3A is a perspective diagram of the example embodiment break away spline receiver of FIG. 1.

FIG. 3A is a perspective diagram of the break away spline receiver 150 of FIG. 1. The break away spline receiver 150 comprises a receiver end 152 and a shaft end 175. The receiver end 152 includes a receiver bore 155 for receiving a lobe end of a break away spline coupler (e.g., the lobe end 130 of the break away spline coupler 105 of FIGS. 2A-2F) and gaps 160 for accommodating a major lobe diameter of a lobe end of a break away spline coupler (e.g., the major lobe diameter 137 of the lobe end 135 of the break away spline coupler 105 of FIG. 2C). The shaft end 175 of the break away spline receiver 150 is configured to transfer power to other coaxial components (not shown).

Figure 3B:
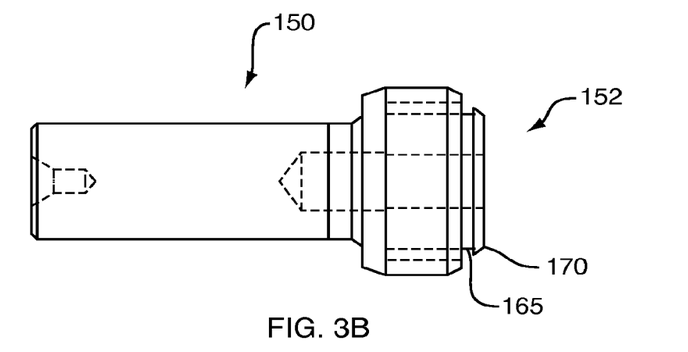
FIG. 3B is a lateral diagram of the example embodiment break away spline receiver of FIG. 3A.

FIG. 3B is a lateral diagram of the break away spline receiver 150 of FIG. 3A. As illustrated, the receiver end 152 includes a retaining ring installation slot 165 and a retaining ring installation lip 170 which, in combination, secure a retaining ring (e.g., the retaining ring 190 of FIG. 1) for assembling the torque-limiting coupling of FIG. 1.

Figure 3C:
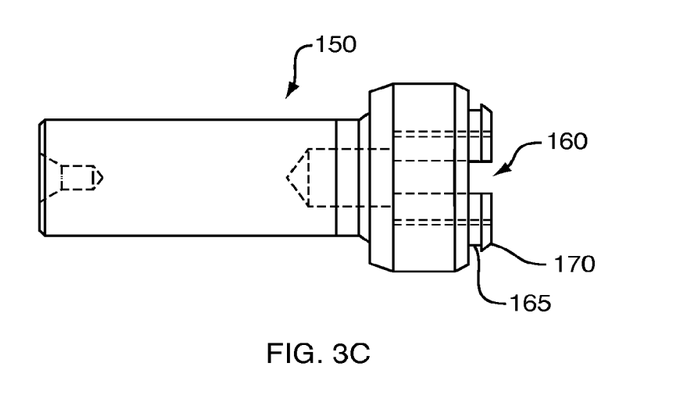
FIG. 3C is a lateral diagram of the example embodiment break away spline receiver of FIG. 3A rotated ninety degrees axially from its orientation as shown in FIG. 3B.
Figure 3D:
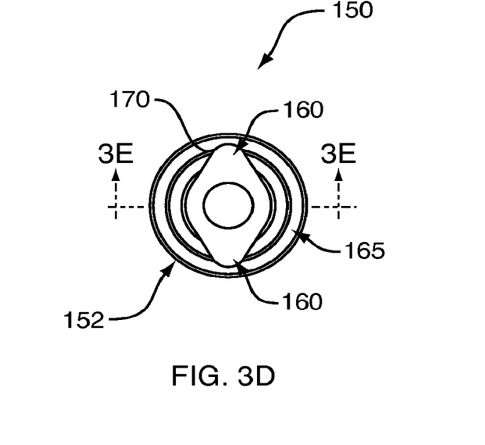
FIG. 3D is an axial diagram of the example embodiment break away spline coupler of FIG. 3A from a receiver bore end.
Figure 3E:
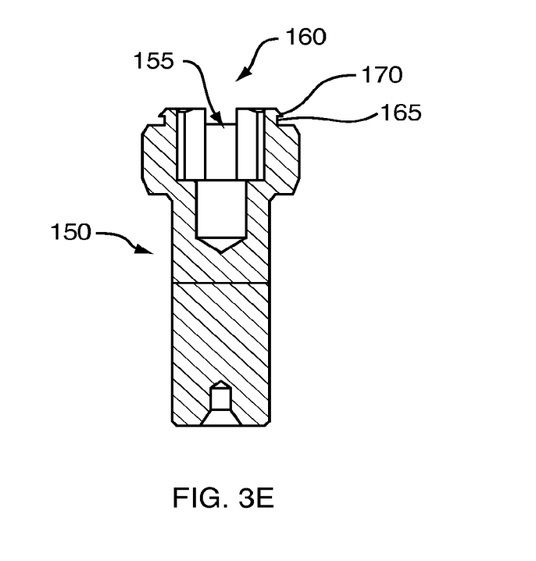
FIG. 3E is a cross-sectional diagram of the example embodiment break away spline coupler of FIG. 3D taken along line A.

FIG. 3C is a lateral diagram of the break away spline receiver 150 of FIG. 3A rotated ninety degrees axially from its orientation as shown in FIG. 3B. As can be seen, the retaining ring installation slot 165 and the retaining ring installation lip 170 are interrupted circumferentially by the gaps 160 for accommodating the major lobe diameter 137 of the lobe end 135 of the break away spline coupler 105 of FIG. 2C. These features can also be seen in FIG. 3D, which is an axial diagram of the example embodiment break away spline coupler 150 of FIG. 3A from a receiver bore end 152, and FIG. 3E, which is a cross-sectional diagram of the example embodiment break away spline coupler 150 of FIG. 3D taken along line A. Note that the axial orientation of the break away spline receiver 150 in the cross sectional diagram of FIG. 3E corresponds to that of the break away spline receiver 150 as illustrated in FIG. 3C.

FIGS. 4A-4D illustrate several views of the assembled torque-limiting coupling 100 of FIG. 1.

Figure 4A:
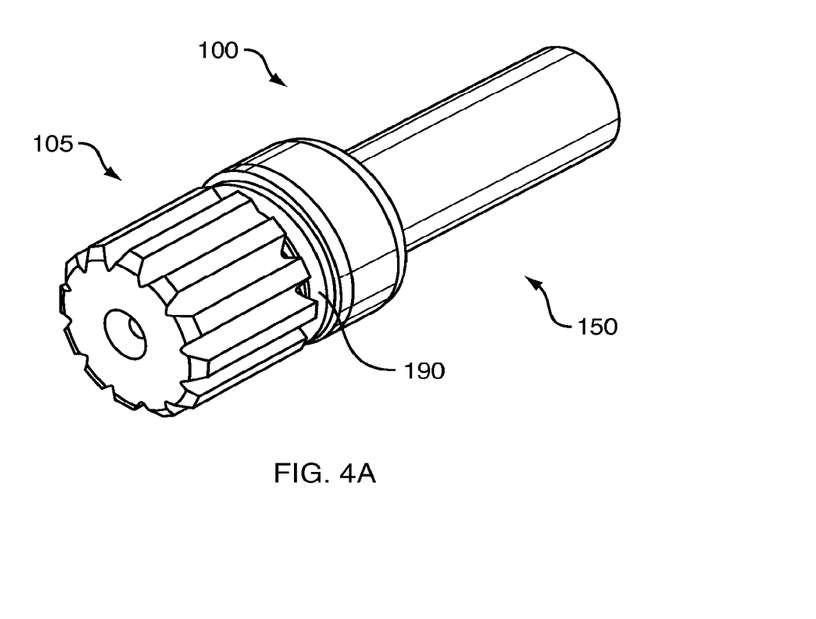
FIG. 4A is a perspective diagram of the example embodiment torque-limiting coupling of FIG. 1 in an assembled state.
Figure 4B:
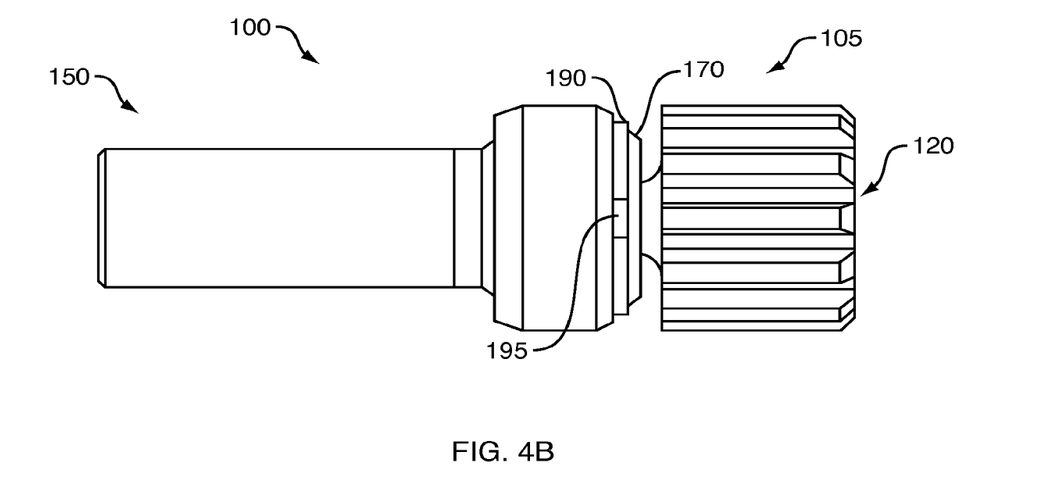
FIG. 4B is a lateral diagram of the assembled example embodiment torque-limiting coupling of FIG. 4A.

FIGS. 4A-4B are perspective and lateral (or side view) diagrams, respectively, of the assembled torque-limiting coupling 100 of FIG. 1. Referring to both FIGS. 1 and 4A, the o-ring 180 may be inserted into the o-ring slot 140 prior to inserting the lobe end 130 of the break away spline coupler 105 into the receiver bore 155 of the break away spline receiver 150. After insertion of the lobe end 130 of the break away spline coupler 105 into the receiver bore 155 of the break away spline receiver 150, the retaining ring 190 may be installed, via its opening 195 into the retaining ring installation slot 160 of the break away spline receiver 150, thereby securing the break away spline coupler 105 to the break away spline receiver 150 to from the assembled torque-limiting coupling 100. As shown in FIG. 4B, the opening 195 in the retaining ring 190 is visible.

Figure 4C:
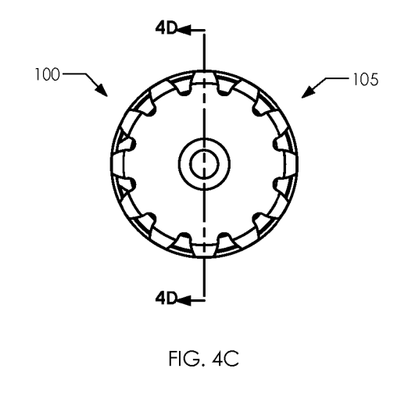
FIG. 4C is an axial diagram of the assembled example embodiment torque-limiting coupling of FIG. 4A from the break away spline coupler 105 end.
Figure 4D:
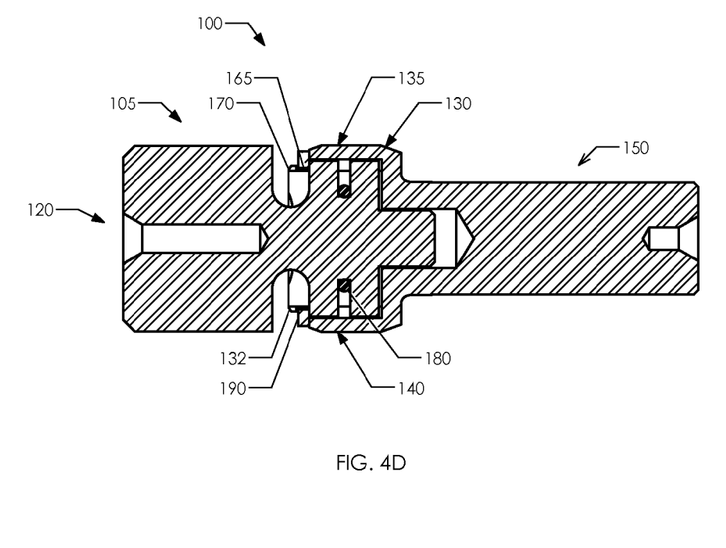
FIG. 4D is a cross sectional diagram of the assembled example embodiment torque-limiting coupling of FIG. 4C taken along line A.

FIG. 4C is an axial diagram of the torque-limiting coupling 100 of FIG. 4A from the break away spline coupler 105 end. A cross-sectional diagram of the torque-limiting coupling 100 of FIG. 4C taken along line A is provided in FIG. 4D. As can be seen, the retaining ring 190 secures the break away spline coupler 105 to the break away spline receiver 150 by inhibiting lateral movement of the lobe end 130 of the break away spline coupler 105 from the receiver bore 155 of the break away spline receiver 150 by contacting both the lip 170 of the break away spline receiver 150 and a surface 132 of the lobe 135. Further, the o-ring 180 is installed in the o-ring slot 140. The o-ring 180, which may have a softer durometer than the material than that from which the break away spline coupler 105 is manufactured, may eliminate rattle produced by the break away spline coupler 105 as installed with the break away spline receiver 150, thereby reducing vibration and wear in the coupling 100. Such an o-ring 180 may be a high temperature o-ring and may be made of VITON® or similar flouroelastomer material.

The break away spline coupler 105 may be configured during manufacture to break at the neck region 125 at a particular torque limit. The geometry of the neck region 125 (i.e., fracture zone) may be designed for adjusting the torque limit to exact requirements by reducing the cross-sectional area of the neck region 125, thus causing higher shear stresses to be experienced. The cross sectional area of the neck 125 may be reduced, at least, by: (1) adjusting the depth of the bore 120 (e.g., shallower or deeper into the break away spline coupler 105); (2) changing the outer diameter of the neck region 125; and (3) a combination of both. The break at the neck region 125 is therefore highly predictable and results in a clean break with no failure or stripping of the drive feature. This eliminates, or at least reduces, the possibility that a failure of an accessory can cause the failure of engine components by introducing fragments into the gear case.

Thus, the assembled torque-limiting coupling 100 may provide a torsion drive between an engine (e.g., an aircraft engine) and a driven accessory (e.g., a generator). If the accessory should experience a catastrophic failure, such as a locked bearing or a broken rotor shaft, a torsion limit is exceeded and the spline 105 breaks away from the coupling 100. This guarantees that the internal engine gearing used to drive the accessory is not compromised and interfering with essential moving parts inside the engine.

Further, misalignment compensation provided by the lobe end 130, including the cam lobe 135, the o-ring 180, and the receiver bore 155, limits the side load and wear that occurs when coupling two precision shafts with little clearance on the bearings. With a misalignment coupling 100, the mount can be slightly out of parallel with no negative effects The torque-limiting coupling 100 may conform to the "AND20000 Rev 4 cancelled on Apr. 29, 1980" convention for providing a drive and mounting configuration of the engine and its accessories. As understood by one of ordinary skill in the art, the male spline 115 on the coupling 100 is installed in the "AND20000 Rev 4 cancelled on Apr. 29, 1980" female spline (not shown). It is common that extra clearance is provided such that the male spline 115 fits loosely, thereby accommodating easy installation and allowing for thermal expansion.

The components of the torque-limiting coupling 100, including the break away split coupler 105 and the break away spline receiver 150, may be highly manufacturable, and may be manufactured using a computer numerical control (CNC) lathe or screw machine. Such manufacturing processes allow for the manufacture of double cam lobe 135 shape of the drive feature. Further, during manufacture, the breaking torque of the break away spline coupler 105 may be calibrated within one foot-pound of a desired torque.

Therefore, the torque-limiting coupling 100, including the break away spline coupler 105 and the break away spline receiver 150, act as an inexpensive mechanical fuse that can be scaled up or down to adapt to many applications. A number of such application are discussed below.

In a first example embodiment, an irrigation pump employing a torque-limiting coupling 100 according to the present invention and includes an expensive impeller. During operation of the pump, it draws in a stone that enters the impeller housing, or the intake becomes clogged by another means. The expensive impeller is, thus, unable to continue operating an experiences an increased torque. The break away split coupler 105 breaks instantaneously, therefore becoming a sacrificial link and preventing serious damage to the expensive impeller. Traditional devices, such as a "slip clutch," however, would overheat and cause strain to the driving motor or engine maintaining torque on the pump.

In a second example embodiment, a farming machine, such as a tractor with a rotary cultivator, for example, strikes a stump or a large stone while being used in the field. Typically, it is the weakest link in a drive system that fails. If this weakest link is in the transmission, expensive damage is likely to occur. Further, if this weakest link is in an exposed universal joint on a spinning drive shaft, replacement of damaged parts can be expensive, and bystanders are put at risk of being struck by fragments from the broken component. Moreover, if the weakest link is a tine on the cultivator, the tine may be broken or bent. However, a torque-limiting coupling 100 according to the present invention, including the break away spline coupler 105 and break away spline receiver 150, mounted at the output of the transmission or, alternatively, at the input of the implement, becomes a mechanical fuse that breaks instantaneously preventing damage to the rest of the machine and can be replaced quickly.

Further, consider a situation in which a power boat or fishing vessel veers off course and strikes a reef. It is well-known that the propeller of a large boat can be an extremely expensive part, and that repair can be costly, both as a direct result of parts and labor for the repair and opportunity cost caused by the boat being unavailable for use. Further, being stranded at sea has its obvious disadvantages and perils. However, a torque-limiting coupling 100 according to the present invention, including the break away spline coupler 105 and break away spline receiver 150, can react faster than other failsafe items that may be present, including slip clutches and other break-away rubber couplings, and can be replaced more easily and economically.

Moreover, a torque-limiting coupling 100 according to the present invention, including the break away spline coupler 105 and break away spline receiver 150, may be used on any type of machinery in which human body parts may be introduced accidentally, thereby causing an increase in a torsion load experienced by the machinery. In such a situation, the faster the machinery is able to react to the increased torsion load by shutting down, the less trauma will be experienced by a victim whose body parts were caught in the machinery. Therefore, tuning the break away spline coupler 105, such as by adjusting the depth of the bore 120 (e.g., shallower or deeper into the break away spline coupler 105) and changing the diameter of the neck region 125, to an exact predictable limit can prevent serious bodily harm and even save lives.

While this invention has been particularly shown and described with references to example embodiments thereof, it will be understood by those skilled in the art that various changes in form and details may be made therein without departing from the scope of the invention encompassed by the appended claims.

What is claimed is:

1. A two component torque-limiting coupler consisting of:
 a first component having a first end that is configured to coaxially mate to a receiver said receiver configured to rotate;
 a second component configured to mate to the first component and configured to rotate;
 a neck region positioned mesially within the first component, configured to automatically experience higher shear stresses than either end of the first component and second components when torque is applied;
 the first component further consisting of a bore; and
 wherein a band of material surrounds at least a portion of the first-component's second end, the band of material having softer durometer than the material of the second component.

2. The coupler of claim 1 wherein the first component includes a spline fitting at the first end.

3. The coupler of claim 2 wherein the spline fitting conforms to an external mounting.

4. The coupler of claim 1 wherein the first-component's second end includes at least one cam lobe.

5. The coupler of claim 1 wherein the first-component's second end includes two opposing cams.

6. The coupler of claim 5 wherein the band of material is a rubber ring.

7. The coupler of claim 1 wherein the neck region includes a portion with a smaller cross-sectional area than either ends of the first component or the second component.

8. The coupler of claim 7 wherein the neck region portion with the smaller cross-sectional area has smaller outer diameter than either ends of the first component or the second component.

9. A two component system for transmitting torque, the system consisting essentially of:
    a two component torque-limiting coupler;
    wherein a first component is a rotating component having an axially-centered receiver including splines on a first end and having a second proximal end;
    a second component is a rotating component having a second axially-centered receiver port, the second receiver port having a perimeter profile with varying distance from the axis of rotation;
    wherein the first component's second proximal end has a profile corresponding to the perimeter profile of the second component's receiver port and configured to be inserted into the second component's receiver port;
    wherein the first component's mesial has a neck region configured to experience higher shear loads than either end of the first component and second component when torque is applied;
    a bore on the spline end of the first component; and
    wherein the system further consists of a band of material surrounding at least a portion of the first-component's second end, the band of material having a softer durometer than the material of the second component.

10. The system of claim 9 wherein the first component's first end splines conform to an engine accessory case mounting.

11. The system of claim 9 wherein the profile of the first component's second end component includes a cam lobe.

12. The system of claim 9 wherein the band of material is a rubber ring.

13. The system of claim 12 wherein the neck region portion with the smaller cross-sectional area has a smaller outer diameter than either ends of the first component or the second component.

14. The system of claim 9 wherein the neck region includes a portion with a smaller cross-sectional area than either ends of the first component or the second component.

* * * * *